Jan. 21, 1930.  E. PICK  1,744,415
GAS ANALYZING APPARATUS
Original Filed Aug. 1, 1927
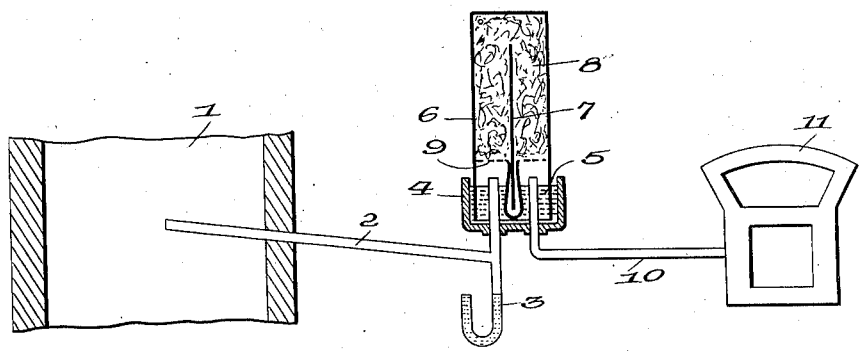
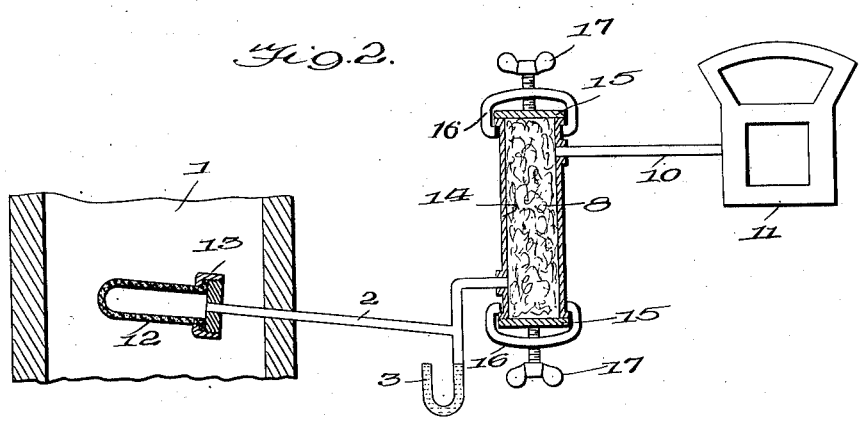
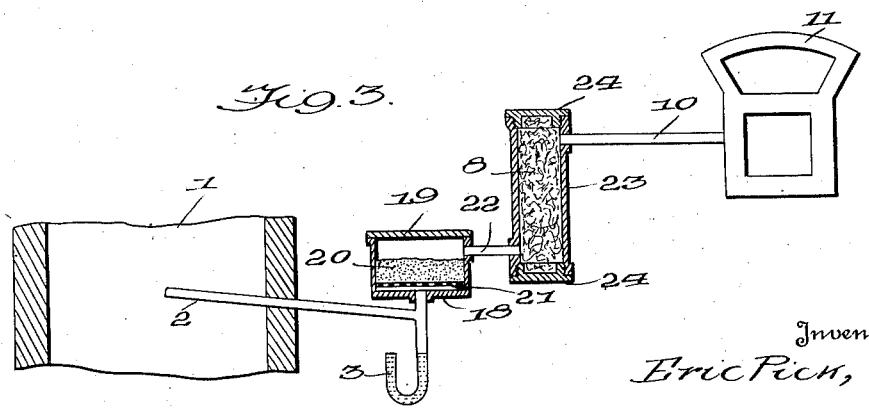
Inventor
Eric Pick,
By W. P. McElroy
Attorney Patented Jan. 21, 1930

1,744,415

UNITED STATES PATENT OFFICE

ERIC PICK, OF NEW YORK, N. Y., ASSIGNOR TO THE PERMUTIT COMPANY, OF NEW YORK, N. Y., A CORPORATION OF DELAWARE

GAS-ANALYZING APPARATUS

Application filed August 1, 1927, Serial No. 209,764. Renewed September 24, 1929.

This invention relates to gas analyzing apparatus; and it comprises the combination of a gas analyzing or similar apparatus having metal parts with a gas purifying chamber containing a renewable charge of steel wool; all as more fully hereinafter set forth and as claimed.

Gas analyzing apparatus have usually metal parts and connections and it is therefore necessary for accuracy of results that the entering gas besides being freed of solid particles does not contain anything which will corrode or injure these metal parts. This result, however, is difficult to accomplish, and particularly with flue gas, blast furnace gas, producer gas and the like. Fuels contain sometimes quite appreciable proportions of sulfur. This sulfur burns to $SO_2$ or $SO_3$ in the furnace; and when the flue gases are cooled down to room temperature some condensation always takes place, producing moisture which combines with the $SO_2$ or $SO_3$ to form $H_2SO_3$ or $H_2SO_4$, respectively. These acids are highly corrosive to most metals and, further, to the extent of their presence vitiate the results of a flue gas analyzer. Furthermore, much of the mineral matter carried by flue gas is very fine, its fineness sometimes approaching that of a fume, and it is found hard in practice to filter it with such perfection that the apparatus will not gradually accumulate dust.

After extensive experience in the operation of flue gas analyzers and more particularly $CO_2$ recorders, I have found that the best way to treat gas to be examined, is to pass it through a rather compact mass of steel wool. Steel wool forms a very pervious or porous mass and imposes no great friction on gas passing therethrough; nevertheless, its action in removing even very fine suspended matter is exceptionally thorough. Not being hygroscopic, it does not absorb and swell with moisture in the gas, as do cotton, sawdust, etc. and cause an increase in flow resistance. Steel wool has great porosity, even when considerably compressed and it does not pack and clog readily as do cotton and other organic filtering materials. Neither does it tend to channel as does glass or other mineral wool. Part of its great power for picking up suspended solids is possibly due to the excessively fine film of mineral oil which the commercial material carries from the process of manufacture.

The most important property of steel wool in this relation is, however, the very effective cleaning action it exercises by removing the corrosive fumes above referred to. It is considerably more efficient in this respect than other forms of metallic iron, a fact possibly partly due to the highly strained condition in which the metal exists due to cold deformation during manufacture, and possibly due to the very large surfaces per unit of weight as well as per unit of volume. It is not necessary to heat the steel wool or to use catalyzers in combination with it in order to obtain the desired de-acidifying effect.

In actual use in gas analyzing, I find with acid gases a steel wool filter ordinarily does not last long, the acid constituents in the gas attacking it. Sometimes with a $CO_2$ recorder in use on flue gas a steel wool charge may last only a week before replacement is required. In such a case, a charge of this wool corrodes gradually, corrosion starting at the inlet, and it finally breaks down to a powder. However as long as there is still unchanged steel wool in the path of the gases the filter functions well. In practice, it is often desirable to combine the steel wool with a mechanical dust filter of some other type. For instance, a porous stony material such as carborundum, or sawdust forms a useful preliminary filter to remove coarse dust, prior to the passage of the gases through the steel wool. While I have found the steel wool by itself highly efficient for my purpose, in some relations an admixture of other fibers, such as cotton, may be used.

In the accompanying drawing, showing several forms of my invention,

Figure 1 is a view partly in section and partly in elevation, illustrating the use of a steel wool filter in connection with a flue gas analyzer; and Figures 2 and 3 are similar views showing the combination of a preliminary filter with a steel wool filter, also in connection with a flue gas analyzer.

Referring to Fig. 1, a flue gas sample is drawn through the pipe 2 from the flue or boiler pass 1. The pipe 2 is sloped towards the outside so that any condensed moisture flows to the water leg 3 whence it is drained automatically. The tube 2 rises through the liquid seal 5 in the filter pot 4. The steel wool 8 is placed in the container 6 having a dividing wall 7 which does not extend all the way to the top. The steel wool 8 is held in place by the steel wool holder 9 which is clamped on to the dividing wall 7. When the steel wool container 6 is put in its proper place in the filter pot 4, the liquid seal 5 prevents any gas leakage and also causes the gas to flow upwardly through the steel wool 8 on the left hand side and downwardly on the right hand side of the dividing wall 7. The gas then flows through the pipe 10 to the flue gas analyzer 11.

In Fig. 2, the combination of a steel wool filter with a porous stone filter 12 is shown. This porous filter is located inside the flue 1 and attached to the pipe 2 by means of the coupling 13. This arrangement has the advantage that most of the suspended matter is kept out of the pipe line. The steel wool 8 is placed in the steel wool container 14. In order to replace the steel wool it is only necessary to loosen the thumb screws 17 whereupon the yokes 16 and covers 15 may be removed.

Where the gas temperature is very high a filter located in the gas duct cannot be used and an external filter has to be employed instead. This arrangement is shown in Fig. 3. The gas sample again is taken from the gas duct 1 and flows through the pipe 2 to the preliminary filter container 18 which has a removable cover 19. The container 18 holds sawdust, cotton or the like, 20, which is supported by a strainer plate 21. From the preliminary filter the gas flows through pipe 22 to the steel wool container 23 which is filled with steel wool 8. Removable covers 24 are provided for easy replacement of the steel wool. From the steel wool filter the gas flows through the pipe 10 to the flue gas analyzer 11.

It is of course not necessary that the preliminary filter and the steel wool filter be physically separated. It is for instance possible to place the preliminary filtering material in the one half of the container 6 shown in Fig. 1, whereas the steel wool is placed in the other half. Furthermore, if so desired, the steel wool 8 can be mixed with cotton, excelsior or some other fiber in any of the steel wool containers, 6, 14, or 23 shown in Figures 1, 2 and 3 respectively.

While I have found the present invention of particularly great utility in connection with mechanically operating $CO_2$ recorders for the products of combustion or flue gases from boiler furnaces, it is useful in connection with any other analyzing or metering device having metal parts and dealing with gases which are, or may be, of acid nature.

What I claim is:—

1. The combination with a gas measuring device having metallic parts which can be affected by fumes or impurities in the gas, of a filter through which the gas flows before reaching the measuring device, such filter comprising a mass of steel wool.

2. The combination with a gas measuring device having metallic parts which can be affected by fumes or impurities in the gas, of a filtering device through which the gas flows before reaching the measuring device, such filtering device comprising a compact mass of steel wool.

3. The combination with a gas measuring device having metallic parts which can be affected by fumes or impurities in the gas, of a filtering device through which the gas flows before reaching the measuring device, such filtering device comprising a container, a mass of steel wool therein, and a preliminary filter for removing coarser suspended particles from the gas before they reach the steel wool.

In testimony whereof, I have hereunto affixed my signature at New York, N. Y., this 30th day of July, 1927.

ERIC PICK.